| ADDRESS & AUXILIARY FUNCTION | | | MAIN FUNCTION OPERATION | | | | | |
|---|---|---|---|---|---|---|---|---|
| TONE 1 | TONE 2 | TONE 3 | TONES 1 TO 11 | TONES 1 TO 11 | TONES 1 TO 11 | TONES 1 TO 11 | TONES 1 TO 11 | Hi TONE |
| TONE GROUP 1 | GROUP 2 | GROUP 3 | GROUP 4 | GROUP 5 | GROUP 6 | GROUP 7 | GROUP 8 | GROUP 1 / GROUP 2 |
| TONE 12 OR 13 | TONE 12 OR 13 | TONE 12 OR 13 | TONE 14 | TONE 15 | TONE 16 | TONE 17 | TONE 18 | LO TONE |
| AUX. FUNCTIONS OPERATION | | | MAIN FUNCTIONS | | | | | |

→ TIME

Inventors
Theodore Saltzberg &
John S. Dame
By Mueller and Aichele
Attys.

Inventors
Theodore Saltzberg &
John S. Dame.
By
Mueller and Aichele
Attys.

Inventors
Theodore Saltzberg &
John S. Dame
By Mueller and Aichele
Attys.

Inventors
Theodore Saltzberg &
John S. Dame
By
Mueller and Aichele
Attys.

United States Patent Office 3,454,927

Patented July 8, 1969

3,454,927

REMOTE CONTROL SYSTEM USING FREQUENCY CODE PATTERNS TRANSMITTED IN A PARTICULAR SEQUENCE

John S. Dame, Elmhurst, and Theodore Saltzberg, Chicago, Ill., assignors to Motorola, Inc., Franklin Park, Ill., a corporation of Illinois Filed Jan. 25, 1965, Ser. No. 427,778
Int. Cl. H04q 3/00, 7/02; H04b 7/00
U.S. Cl. 340—171 5 Claims

ABSTRACT OF THE DISCLOSURE

A signaling system for remote control of machinery is provided in which the control signals consist of a plurality of tone groups transmitted in a particular sequence. Each tone group consists of two tones of different frequencies with each tone group always having a tone of a particular frequency transmitted during the time period for the particular tone group. The position of the tone group in the sequence determines the function to be carried out and the second tone determines the operation to be carried out by the function selected.

This invention relates to a signaling system for remote control purposes, and in particular to the control of machinery from a remote location by radio signals.

It is desirable to provide a system whereby a person can control the operation of heavy machinery, such as locomotives or overhead cranes, which are located at some distance from the operator. The ability to control remotely located machinery will improve efficiency, economy of operation and safety. With conventional control systems, located at the machinery under control, the operator often cannot see the area where the force under his control is applied and must rely upon signals from other persons. Pendant controls have been used but these offer the restrictions of being attached to the machinery and requiring the operator to remain close to the machine under control and to follow its movements. By providing a radio system for the remote operation of the machinery, the operator can position himself so that he can closely observe the action of the machinery under his control, thus increasing safety and efficiency.

In a system for the remote control of machinery, great care must be taken to provide for reliable operation. Since the machinery under control is capable of exerting large forces, a malfunction or improper operation could result in great property damage and loss of life. Several different machines may be radio controlled in the same area and the radio noise in the vicinity may be very high. Thus radio remote control systems must provide for the rejection of spurious signals and control signals for other machines, so that they will not be interpreted as control signals misdirecting the desired operation of the machinery.

It is therefore an object of this invention to provide an improved radio signaling system for remote control of machinery.

Another object of this invention is to provide a radio signaling system for remotely controlling the operation of a plurality of machinery functions.

A further object of this invention is to provide a radio signaling system for remote control of machinery which is not responsive to radio interference.

Another object of this invention is to provide a radio signaling system for remote control of machinery which is not responsive to control signals addressed to other machines.

A feature of this invention is the provision of a radio signaling system for remote control of machinery in which a fixed sequence of tone groups is transmitted to the machine under control, with each tone group controlling a separate function of the machine.

Another feature of this invention is the provision of a radio signaling system for remote control of machinery wherein each of the tone groups are comprised of a pair of tones with one tone designating the function to be controlled and the other tone designating the operation to be carried out by that function.

Another feature of this invention is the provision of a radio signaling system for remote control of machinery wherein the tones in a tone group are in different spaced frequency bands and wherein the received signal is checked to determine that one and only one tone from each frequency band is present at one time.

Another feature of the invention is the provision of a radio signaling system for remote control of machinery wherein a first portion of the fixed sequence of tone groups identifies the particular machine under control.

The invention is illustrated in the drawings wherein.

In practicing this invention a radio signaling system for remote control of machinery is provided, consisting of a control unit for generating and transmitting control signals and a receiving unit located at the machinery to be controlled. The machine operator exercises control over the machine by positioning controls on the control unit. The control unit can be made portable to be carried by the operator to the desired operating position. The control unit generates a fixed sequence of tone groups with each tone group consisting of two tones, one a high frequency tone and the other a low frequency tone. One tone in each of the tone groups denotes the function to be performed by the machinery under control, while the other tone denotes the operation to be carried out by the particular function. A first portion of the fixed sequence of tone groups is arranged in a particular order to provide an address signal, which designates the remote device to be controlled. The receiving unit is responsive only to signals having the proper address. Further verification of the signal is accomplished by requiring the presence of a high frequency and a low frequency tone in each tone group. Each function is controlled by a tone group occupying a particular position in the fixed sequence. Thus, in order for a tone group to be operative to control a particular function, the tone representing that function must appear at the correct position in the fixed sequence.

Figures 1, 2:
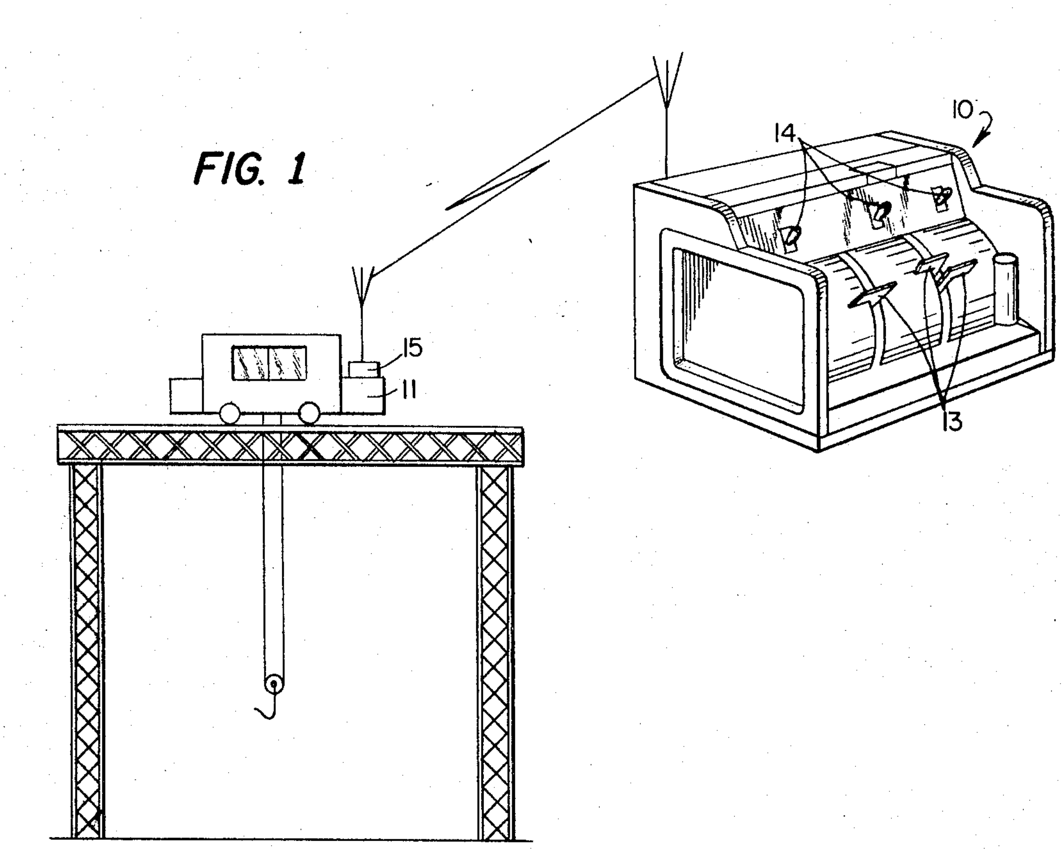
FIG. 1 is a block diagram of the system.
FIG. 2 is a diagram showing the arrangement and sequence of the tones in the control signal.

FIG. 1 illustrates a system for the remote control of a machine, for example an overhead crane 11. A control unit 10, which can be carried by the operator or positioned at a desired location, contains control levers 13 and control switches 14 for operating various functions of overhead crane 11. Control unit 10, in response to the positioning of controls 13 and 14, generates a control signal which is transmitted by radio to a receiving unit 15 located on overhead crane 11. The control signal consists of a fixed sequence of tone groups which contain the information necessary to operate overhead crane 11.

An illustration of the sequence of tone groups, comprising the control signal used to control the operation of a remote device, is illustrated in FIG. 2. In this example, 11 high frequency tones and 7 low frequency tones are used to form the tone groups. However, the system is not restricted to this number of tones or groups and any number of tones and groups consistant with the requirements of the system may be used. Also, while the high and low frequency tones are designated for certain purposes in this example, they are not restricted to these purposes and the high and low frequency tones can be interchanged.

As shown in FIG. 2, the tone groups are transmitted in a fixed sequence, tone group 1 being followed by tone group 2, which is followed by tone group 3, and so forth, until tone group 8 has been transmitted. Following tone group 8, tone group 1 is again transmitted. This sequence of transmission is continued as long as the control unit is used to operate the remote device.

A single high frequency tone and a single low frequency tone form each tone group. For convenience the tones in the high frequency tones are labeled from tone 1 to tone 11, while the low frequency tones are designated from tone 12 to tone 18. The first three tone groups transmitted form the address of the remote device to be operated. The address consists of three high frequency tones transmitted in a particular order, in this example tone 1 followed by tone 2, followed by tone 3. The remote device will only responds to a signal which is preceded by these three high frequency tones transmitted in the proper order. By using an address, security and reliability of operation is achieved as the remote device will not respond to signals from other electromagnetic radiation generators, or to similar control units for other remote devices which may be operated in the vicinity.

Since each tone group requires two tones to be complete, a low frequency tone is also transmitted with each of the address tones in tone groups 1, 2 and 3. In this example, low frequency tone 12 or low frequency tone 13 is transmitted with each of the high frequency tones transmitted as part of the address group. By assigning two low frequency tones to the address tone groups it is possible to use the tones of the address groups to control functions of the remote device. These low frequency tones are used to operate auxiliary functions which do not require the degree of control operation that is required by the main functions. Examples of these are: the ringing of a bell, flashing of a light, or the blowing of a whistle. In this example if the function is to be performed, the low frequency tone 12 will be transmitted with the high frequency tones of the address. If the function is not to be performed, tone 13 of the low frequency tones is transmitted with the high frequency tone of the address. The auxiliary functions are thus limited to functions which have two states, for example on and off.

The main functions are designated by low frequency tones 14, 15, 16, 17 and 18 transmitted in that order. Note that in order for any function to be performed, the tone designating that function must be received at the proper time. Thus, if tone 14 is received during the time period for the reception of tone 15, the function designated by tone 14 will not be performed. Also, if a higher degree of security is required than that furnished by using three high frequency tones for the address, the order of the low frequency tones can be made different for different units. In this case a receiving unit will respond only to a signal having a predetermined order of high and low frequency tones.

Low frequency tones 14 through 18 can be used to control 5 separate motors in the remote device, each separate tone controlling an individual motor. Transmitted with each of the low frequency tones is a particular high frequency tone to form the tone group. The high frequency tone selected to be transmitted with each low frequency tone depends upon the operation to be carried out by the function designated by the low frequency tone. In this example, all of the high frequency tones from 1 to 11 are used to designate the operation desired by the function selected by the low frequency tone. High frequency tones 1 through 5 are used to control the forward speed of the motor, with tone 1 being the slowest forward speed and tone 5 being the fastest forward speed. High frequency tones 6 through 10 are used to control the reverse operation of the motor with high frequency tone 6 being the lowest reverse speed and high frequency tone 10 being the highest reverse speed. Tone 11 is used to turn off the motor.

When the proper tones are not present at the proper place in the tone group sequence, the function normally controlled at that time is turned off. The tone groups are transmitted rapidly with the entire group of 8 tone groups being transmitted in a time interval of the order of 160 milliseconds. The system is not limited to this number of groups nor this time interval. Any number of groups and any time interval consistent with the requirements of the system can be used.

Figure 3:
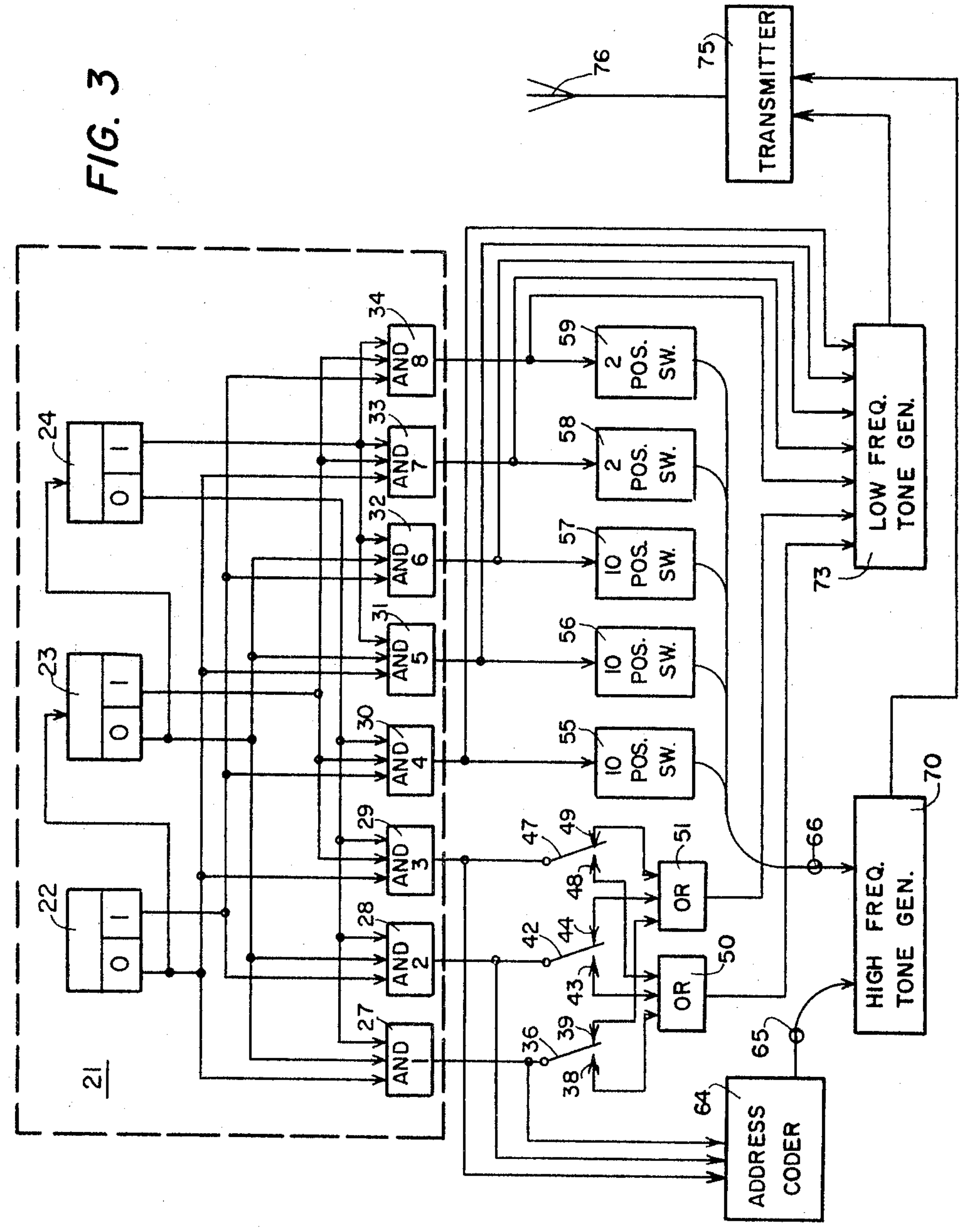
FIG. 3 is a block diagram of the control unit.

FIG. 3 is a block diagram of control unit 10. A scanner 21 energizes each of the function controls in a fixed sequence and selects the particular tones associated with each function. As previously described, the first three tones selected are high frequency tones representing the address and the next five tones selected, completing the fixed sequence, are low frequency tones associated with specific control functions. Control unit scanner 21 consists of three multivibrators 22, 23 and 24 whose outputs are coupled to a series of eight AND gates 27 to 34. Multivibrator 22 is astable and upon returning to the zero state transmits a pulse to bistable multivibrator 23 shifting the state of that multivibrator. When multivibrator 23 shifts to its zero state, an output pulse is coupled to bistable multivibrator 24 changing the state of this multivibrator.

The outputs from each of the multivibrators are coupled to AND gates 27 to 34 to selectively energize the eight AND gates. Each AND gate has three inputs, one from each multivibrator. When each of the three inputs to a particular AND gate are energized, an output signal from that AND gate is developed. Thus the selectively energized AND gates develop signals which are used to select the desired tone combinations in a particular order. While scanner 21 has been described as illustrated in FIG. 3, any electrical or mechanical system which will selectively generate the required output signals in a predetermined order can be used.

As previously described the first three tones transmitted are the address tones. Thus the outputs from AND gates 27, 28 and 29, the first three AND gates to be energized, are coupled to address coder 64, Address coder 64 is coupled, through cable 65 to ten of the eleven tones controlled by high frequency tone generator 70. By means of interconnecting circuits in address coder 64, the three input lines from AND gates 27, 28 and 29 are coupled, in the desired order, to the three high frequency tone generators in high frequency tone generator 70 to cause the three address tones to be generated in the proper order.

The outputs from AND gates 27, 28 and 29 are also coupled to switches 36, 42 and 47 respectively, which are shown in their OFF positions. Thus the output of each switch is coupled to OR gate 51 which selects a low frequency tone designating that the particular function controlled by that switch is to be turned off. This low frequency tone combined with the high frequency tone of the address provides a two-tone group for transmission. If switches 36, 42 and 47 are changed to their ON position, as for example, changing switch 36 from position 39 to position 38, the switch so changed is coupled to OR gate 50 which selects a different low frequency tone to be combined with the high frequency address tone and which designates that the function controlled by the switch is to be turned on.

The outputs of AND gates 30, 31, 32, 33 and 34 are coupled respectively to eleven-position switches 55, 56 and 57 and to two-position switches 58 and 59 to selectively energize these switches. The output of each of these switches is connected to high frequency tone generator 70 through cable 66. Eleven-position switches 55, 56 and 57 select one of eleven high frequency tones, depending upon the position of the switch, to control the speed of motors as previously described. Two-position switches 58 and 59 select one of two high frequency tones, and may be used for operation of other functions requiring two states, as for example the turning ON and OFF of an electromagnet. Switches 58 and 59 could be eleven-position switches for controlling a motor as are switches 55, 56 and 57. The outputs of AND gates 30, 31, 32, 33 and 34 are also coupled to low frequency tone generator 73 for selectively energizing the low frequency tones which are to be combined with the high frequency tones to form a two-tone group.

Tone generators 70 and 73 may consist of tone generation devices which can generate any selected one of a plurality of tones. An example of a tone generator useful in this system would be a series of oscillators, each having a different frequency, with the oscillator having the desired frequency selected by gates or switches. The tone generation means may also consist of a single oscillator, the output frequency of which is selectively changed by the input signals from the control switches.

The output tones from high frequency tone generator 70 and low frequency tone generator 73 are combined in transmitter 75 to form a tone group. The tone groups modulate a carrier signal which is radiated by antenna 76.

Figure 4:
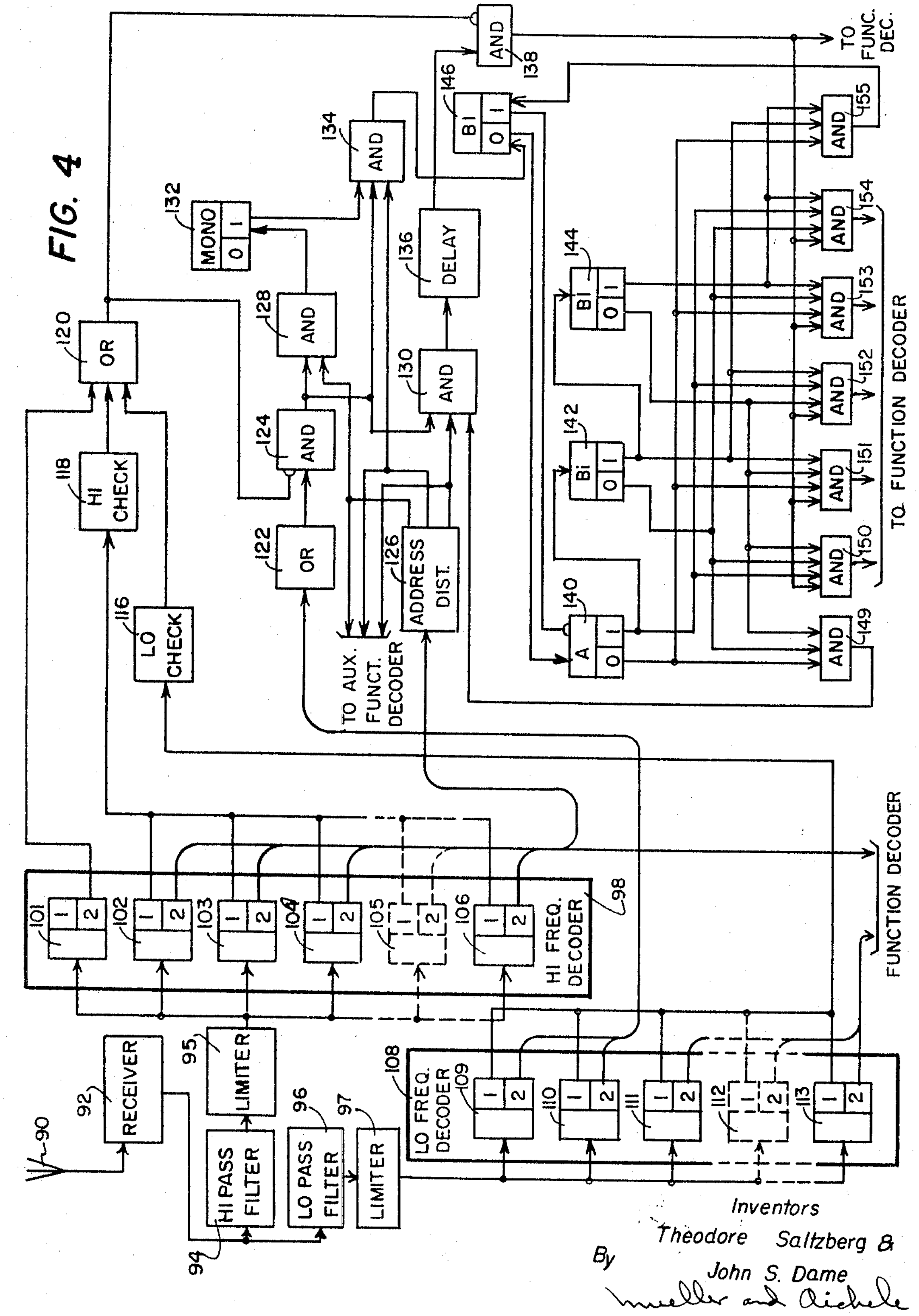
FIG. 4 is a block diagram of the receiving unit.

The receiving unit located at the machinery and control is illustrated in FIG. 4. The radio signal is received by antenna 90 and applied to receiver 92 where it is detected to develop the tone groups sent by the transmitter. The tone groups from the receiver are coupled to highpass filter 94 and lowpass filter 96 where the tones are separated. Limiter 95 couples the high frequency tones to high frequency decoder 98 and limiter 97 couples the low frequency tones to low frequency decoder 108. The limiter aids in the rejection of non-wanted signals. The output level of the limiter and the threshold of the following tone decoders are set 4 db apart. Thus, if two tones of about the same amplitude and in the same frequency group happen to be present neither could be decoded since there is not enough output present at either frequency to activate the decoders. Noise such as squelch noise would have the same effect if present.

High frequency decoder 98 has a tone decoder unit for each high frequency tone used in the system. The tone decoders are represented by units 101 to 106, each of which is responsive to a different tone. Tone decoders 101 to 106 may be comprised of a tuned circuit coupled to a Schmitt trigger or monostable multivibrator circuit. Each of tone decoders 101 to 106 has two outputs, the number one output being present when the tone to which that decoder is responsive is not received, and the number two output being present when a tone to which that decoder is responsive is being received. Low frequency decoder 108 has low frequency tone decoders 109 to 113 which operate in the same manner as the high frequency tone decoders. The number of tone decoders in low frequency decoder 108 and high frequency decoder 98 is dependent upon the number of tones of each frequency group used in the system.

The number one outputs of each of the high frequency tone decoders 102 to 106 are coupled to high check circuit 118. The number one outputs from the low frequency tone decoders 109 to 113 are coupled to low check circuit 116. Low check circuit 116 and high check circuit 118 may consist of a differential amplifier or Schmitt trigger so balanced that there is an output from the differential amplifier when two or more of the tone decoders coupled thereto are in the number 2 state. Thus the low check circuit 116 will have an output if more than one low frequency tone is present, and high check circuit 118 will have output if more than one high frequency tone is present.

The outputs from low check circuit 116 and high check circuit 118 are coupled to OR gate 120, as is number two output of high frequency tone decoder 101. The high frequency tone associated with tone decoder 101 represents a stop order, and is applied in the same manner as the high and low check outputs to stop the operation of the machine.

In addition to checking the presence of more than one high frequency and low frequency tone, the receiving unit also must verify the address and the sequence of the tones received. The number two outputs from the high frequency tone decoder are coupled to address distribution circuit 126. The three high frequency tones representing the address are coupled from address circuit 126 to the desired portions of the address verification circuit.

The first high frequency address tone is coupled to AND gate 128, the second high frequency address tone is coupled to AND gate 134, and the third high frequency address tone is coupled to AND gate 130. The two low frequency tones, one of which must be present in order to complete an address, are coupled to OR gate 122. The output of OR gate 122 is coupled to AND gate 124. If the high check and low check circuits have verified the presence of one and only one high frequency and low frequency tone and there is no output from tone decoder 101, AND gate 124 will develop an output which is coupled to AND gates 128, 134 and 130. The other input to AND gate 128 is the first high frequency tone of the address. The output of AND gate 128 is coupled to monostable multivibrator 132, switching the multivibrator to its unstable state. Monostable multivibrator 132 remains in its unstable state for a period of time long enough for the second high frequency address signal to be verified.

The output of monostable multivibrator 132 is coupled to AND gate 134 together with the second high frequency address tone and an output from AND gate 124. The output from AND gate 124 again verifies that a proper low frequency tone is present, that not more than one high frequency and low frequency tones are present and that there is no output from tone decoder 101.

The output of AND gate 134 is a synchronization pulse and is coupled to bistable multivibrator 146 switching the multivibrator to its zero state. Bistable multivibrator 146 remains in is zero state until switched to its first state at a later point in the cycle. With bistable multivibrator 146 in its zero state an enabling pulse is supplied to astable multivibrator 140. At the start of the sequence astable multivibrator 140 is in its zero state and bistable multivibrators 142 and 144 are in their one state, with the three multivibrators 140, 142 and 144 representing the binary number 110 or the decimal number 6. When astable multivibrator 140 is enabled it switches to its first state and the multivibrators represent the binary number 111 or the decimal number 7. The period of astable multivibrator 140 corresponds to the period of the received tone groups and thus when the third high frequency tone address signal is received, astable multivibrator 140 switches to its zero state causing bistable multivibrators 142 and 144 to also switch to their zero state. The output of the multivibrators now represent the binary number 000 or the decimal number 0.

With each of the multivibrators in the zero state AND gate 149 is enabled and an output signal is applied to AND gate 130. The other inputs to AND gate 130 are the proper low frequency signal as before, from AND gate 124, and the third high frequency tone. The output of AND gate 130 is coupled to a delay circuit 136 which maintains an output for a period of time after the address sequence has finished, so that the subsequent tone groups may be properly decoded. The output of delay 136 is applied to AND gate 138, as is the output of OR gate 120. The output from OR gate 120 will inhibit AND gate 138 if there is failure, as shown by the low and high check circuits, or if an off signal is received by tone decoder 101. The output from the output of AND gate 138 is applied to AND gates 150 to 154 which are used to verify the sequence of low frequency tones representing particular functions. The output of AND gate 138 is also applied to certain function decoders which will be described in a subsequent portion of this specification.

After the three high frequency tones of the address are received, low frequency tones representing particular functions are received in a predetermined order. Signals for verifying the correct order reception of the low frequency tones following the address are generated by AND gate multivibrators 140, 142 and 144. To select the desired AND gate multivibrators 140, 142 and 144 count from binary number 001 or decimal number 1 to binary number 101 or decimal number 5. Each binary number generated enables a particular AND gate provided there is an output from the address verifier AND gate 138 as previously described. When the multivibrators reach binary number 110 or decimal number 6, an output from AND gate 155 is generated which switches bistable multivibrator 146 to its first stable state. A signal is then applied to astable multivibrator 140 inhibiting the operation of this multivibrator. At this time the multivibrators 140, 142 and 144 are quiescent until another synchronizing signal is received from the address verifier.

Figure 5:
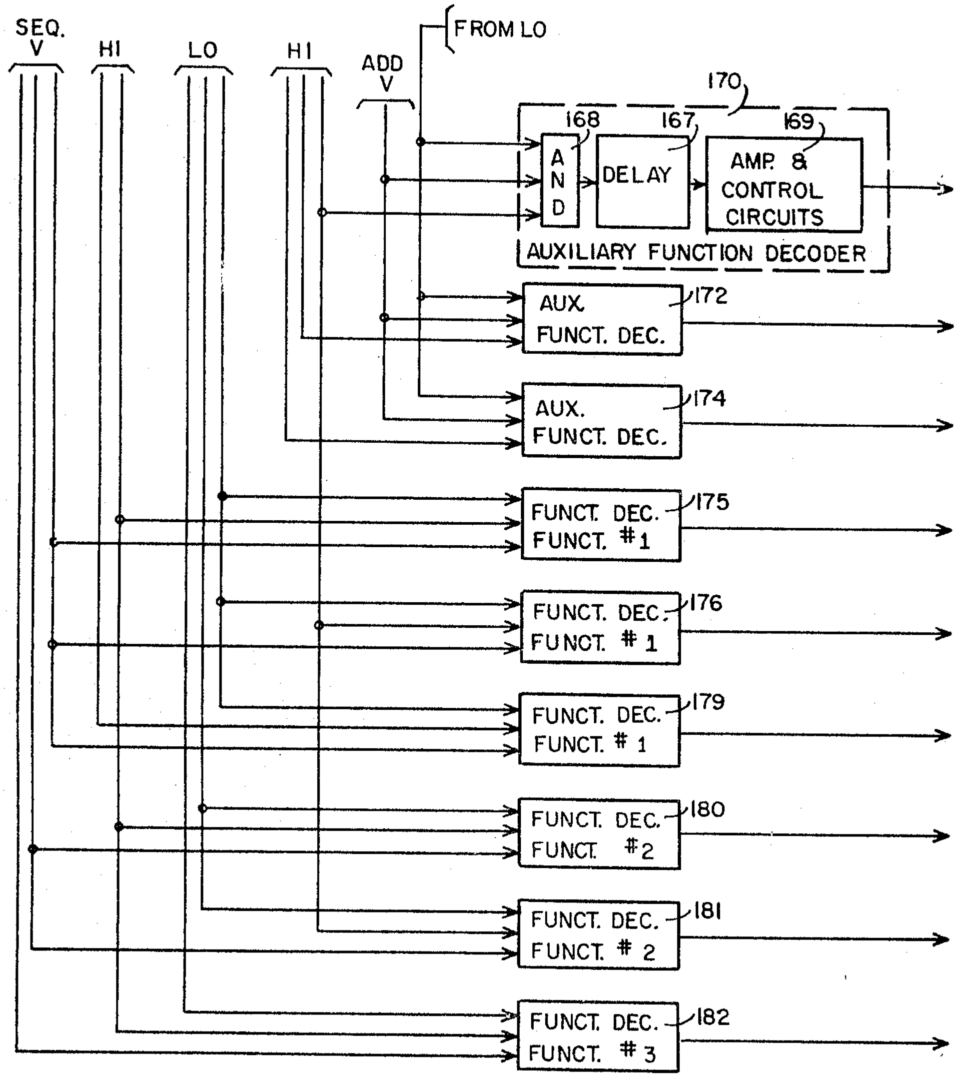
FIG. 5 is a block diagram of the function decoders.

FIG. 5 illustrates function decoders 170 to 182 which are individually coupled to particular controls in the machinery which is to be operated by this remote control system. While only 9 function decoders are shown, the number is limited only by the number of tones used in the system and in the system described, which has 11 high frequency tones and 5 low frequency tones, a total of 53 function decoders could be individually operated by tht system. Function decoder 170 includes an AND gate 168 the output of which is coupled to amplifier and control circuit 169 by delay circuit 167. Delay circuit 167 acts to maintain the output signal from AND gate 168 during the time interval required for the transmission of several sequences of tone groups. This ensures that the desired function will remain enabled even though some sequences of tones are not properly received. The output of amplifier and control circuit 169 is coupled to the machinery controls. Each of the other function decoders 172 to 182, is similarly constituted.

Function decoders 170, 172 and 174 represent the auxiliary function decoders and are used to control functions having only two states, that is, on and off. These auxiliary output modules are operated by the high frequency tones of the address sequence. Each of the function decoders 170, 172 and 174 has an individual high frequency tone of the address coupled to the AND gate contained therein. The other inputs to the AND gate are the address verifier signal from AND gate 138 of FIG. 4 and one of the two low frequency signals which are present with the high frequency signals constituting the address. When all three of the signals occur at the same time the AND gate to which they are coupled is enabled and the particular piece of machinery, coupled to that function decoder is operated.

Function decoders 175, 176, 179, 180, 181 and 182 are operated in a sequence determined by the low frequency tones and are coupled to portions of the machinery requiring more than two states of operation. In this case up to 11 states of operation can be handled by the system described such as would be required by a motor having five speeds forward, five speeds in reverse and an off position. Each of the function decoders 175 to 182 receives a low frequency tone, a high frequency tone and a sequence verifier tone. The sequence verifier tones are coupled from the AND gates 150 to 154 of FIG. 4 in the proper sequence and this signal must be present for any of the AND gates which are controlled by that particular low frequency tone to be operated. If both the low frequency tone and the sequence verifier signal are present at an AND gate, that AND gate will be operated if the high frequency tone is also present.

Thus at any one time only one of the function decoders will be actuated and the function operation controlled by that function decoder will be carried out. Since each function decoder requires both a low and a high frequency tone to operate the same, the modules act to verify the presence of a low and high frequency tone in each group.

We claim:

1. A system for controlling particular functions of a remotely located device, including in combination, a control unit having a plurality of controls mounted thereon, tone generation means for generating first and second pluralities of tones, selector means coupled to said plurality of controls and to said tone generation means, said selector means acting to move repeatedly through a series of positions and to select at each position a first tone from one of said first and second pluralities of tones in accordance with the position of said selector means, said selector means further acting at each of said positions to select a second tone from the other of said first and second pluralities of tones, in accordance with the position of particular ones of said plurality of controls, combining means coupled to said tone generation means for receiving said selected first and second tones and combining them to form a two tone tone group for each of said plurality of selector positions to thereby form a control signal, said control signal having a sequence of two tone tone groups with said first and second tones appearing simultaneously, said first tones of each of said tone groups being in a fixed predetermined sequence denoting the position of that tone group in said sequence and the function to be performed by the remote device, said second tone in each of said tone groups denoting the operation to be carried out by the function selected, utilization means coupled to the remote device and responsive to said tone groups to control the operation of the remote device, and means for transmitting said control signal to said utilization means.

2. The system for controlling particular functions of a remotely located device of claim 1 wherein, said first plurality of tones is in a first frequency band and said second plurality of tones is in a second frequency band spaced apart from said first frequency band.

3. The system for controlling particular functions of a remotely located device of claim 1 wherein, said control signal has a sequence of M tone groups and wherein the first N tone groups form an address portion where N is less than M, said first N tone groups having said first tones thereof arranged in a particular order different from the order of control signals for controlling any other remote device, said utilization means including address verification means and remote device control means, said address verification means being responsive to said address portion to develop an address verification signal with said address portion having the correct sequence of first tones for the remote device, said remote device control means being responsive to said address verification signal and said control signal to cause the remote device to operate as desired.

4. The system for controlling particular functions of a remotely located device of claim 3 wherein, said utilization means further includes sequence verification means, said sequence verification means being responsive to said control signal to develop a sequence verification signal with said M first tones of said control signal having the correct sequence, said remote device control means being responsive to said address verification signal, said sequence verification signal and said control signal to cause the remote device to operate as desired.

5. The system for controlling particular functions of a remotely located device of claim 4 wherein, said utilization means includes tone group verification means, said tone group verification means being responsive to said tone groups to develop a tone group vertification signal with one and only one tone from each of said first and second pluralities of tones being present, said remote device control means being responsive to said address verification signal, said sequence verification signal, said tone group verification signal and said control signal to cause the remote device to operate as desired.

References Cited

UNITED STATES PATENTS

| | | | |
|---|---|---|---|
| 3,159,817 | 12/1964 | Hendricks et al. | 340—171 |
| 3,184,716 | 5/1965 | Smith | 340—171 |
| 3,226,643 | 12/1965 | McNair | 340—171 |
| 3,344,400 | 9/1967 | Nemeth | 340—171 |
| 3,348,108 | 10/1967 | D'Onofrio | 318—16 |

DONALD J. YUSKO, *Primary Examiner.*

U.S. Cl. X.R.

318—16; 343—225